United States Patent [19]

Neki et al.

[11] 4,386,301

[45] May 31, 1983

[54] DIGITAL SPEED CONTROL SYSTEM FOR SEWING MACHINES

[75] Inventors: Shigeo Neki, Osaka; Nozomu Shinozaki; Takashi Dohi, both of Hirakata, all of Japan

[73] Assignee: Matsushita Electric Industrial Co., Ltd., Osaka, Japan

[21] Appl. No.: 199,704

[22] Filed: Oct. 23, 1980

[30] Foreign Application Priority Data

| | | |
|---|---|---|
| Oct. 26, 1979 [JP] | Japan | 54-139071 |
| Feb. 5, 1980 [JP] | Japan | 55-13156 |
| Feb. 5, 1980 [JP] | Japan | 55-13157 |

[51] Int. Cl.³ ............................................. H02P 5/04
[52] U.S. Cl. ................................ 318/318; 318/313; 318/327; 318/341; 318/345 E
[58] Field of Search ............... 318/310, 313, 318, 327, 318/329, 341, 345 E

[56] References Cited

U.S. PATENT DOCUMENTS

| | | | |
|---|---|---|---|
| 2,978,693 | 4/1961 | Champion . | |
| 3,268,788 | 8/1966 | Branco | 318/313 |
| 3,514,685 | 5/1970 | Burgess | 318/318 |
| 3,543,116 | 11/1970 | Haner et al. | 318/318 |
| 3,621,352 | 11/1971 | Dinger | 318/341 X |
| 3,731,301 | 5/1973 | Davis | 318/313 X |
| 4,040,508 | 8/1977 | Sunada . | |
| 4,052,646 | 10/1977 | Massey et al. | 318/341 X |
| 4,104,978 | 8/1978 | Takahashi . | |
| 4,130,785 | 12/1978 | Penet . | |
| 4,139,808 | 2/1979 | Matsumura | 318/269 |
| 4,153,863 | 5/1979 | Schachte et al. | 318/318 X |
| 4,227,137 | 10/1980 | Hartman | 318/327 X |
| 4,278,925 | 7/1981 | Minakuchi | 318/318 X |
| 4,298,832 | 11/1981 | Acker et al. | 318/318 |

FOREIGN PATENT DOCUMENTS

| | | | |
|---|---|---|---|
| 650634 | 2/1963 | Belgium . | |
| 2412895 | 3/1974 | Fed. Rep. of Germany . | |
| 1453454 | 10/1965 | France . | |
| WO80/02780 | 6/1979 | PCT Int'l Appl. | 318/318 |

Primary Examiner—J. V. Truhe
Assistant Examiner—Richard M. Moose
Attorney, Agent, or Firm—Lowe, King, Price & Becker

[57] ABSTRACT

A digital speed control system for a sewing machine comprises a digital speed setting device which responds to manual depression of a foot pedal by generating a digital position signal. A variable frequency divider divides the frequency of speed related pulses so that its output frequency is an integral submultiple of the input frequency, which is variable as a function of the digital position signal. A period detector senses the interval between pulses that occur successively at the output of the frequency divider and generates binary data representing the sensed interval. The interval representing data are translated into second period data in an arithmetic unit according to a predetermined transfer function. A pulse generator translates the second period data into a pulse for activating a magnetic clutch or a magnetic brake depending on the sign of the second period data to accelerate or decelerate the sewing machine.

16 Claims, 9 Drawing Figures

FIG. 6

| PEDAL POSITION | FREQUENCY DIVISION RATIO | | | |
|---|---|---|---|---|
| | I | II | III | IV |
| 0 | 1 | 1 | 1 | 1 |
| 1 | 1 | 1 | 1 | 1 |
| 2 | 1 | 1 | 1 | 1 |
| 3 | 2 | 2 | 1 | 1 |
| 4 | 3 | 2 | 2 | 1 |
| 5 | 4 | 3 | 2 | 2 |
| 6 | 5 | 3 | 2 | 2 |
| 7 | 6 | 4 | 3 | 2 |
| 8 | 8 | 5 | 3 | 2 |
| 9 | 10 | 6 | 4 | 3 |
| 10 | 12 | 8 | 5 | 3 |
| 11 | 15 | 10 | 6 | 4 |
| 12 | 20 | 12 | 8 | 5 |
| 13 | 256 | 256 | 256 | 256 |

Pedal position 0: STOP POSITION

Pedal positions 1–13: OPERATING POSITIONS

DIGITAL SPEED CONTROL SYSTEM FOR SEWING MACHINES

CROSS REFERENCE TO RELATED APPLICATIONS

This application is related to copending application Ser. No. 06/199,705, filed on Oct. 23, 1980.

BACKGROUND OF THE INVENTION

The present invention relates to sewing machine speed control systems, and in particular to a digital sewing machine speed control system in which machine speed is controlled in response to a digital speed setting signal. This invention is particularly advantageous to microcomputer applications and also to manual selection of a desired operating speed characteristic to meet specific sewing machine operation.

A conventional sewing machine speed control system includes an analog circuit that generates an analog speed setting signal in response to depression of a foot pedal. The analog speed setting signal is typically generated by a magnetic sensor located with respect to a permanent magnet which is mounted for movement with the foot pedal, whereby the depression of the pedal results in variation in the amplitude of the output of the sensor.

It is of particular importance that the sewing machine speed be varied with precision in response to a small change in pedal depression. Further, machine speed is varied according to a predetermined operating characteristics. It is often desired that such operating characteristics be manually selected to meet specific operating needs.

However, it would be almost impossible for conventional analog speed control system to achieve precision speed control as well as manual selection of operating characteristics. Further, the analog system is not adaptable to integrated-circuits and to microcomputer applications.

Sewing machine control circuits usually include varied control functions other than speed control functions. To meet these functions, microcomputers are extensively employed not only because of their multifunction capabilities but because of reduction of component parts with a consequential reduction of cost.

SUMMARY OF THE INVENTION

Accordingly, an object of the present invention is to provide a digital speed control system for sewing machines which is adaptable to fabrication of a single semiconductor chip which incorporates various sewing machine control circuits.

The digital speed control system of the present invention comprises a digital pedal depression sensor and a programmable frequency divider which divides the frequency of speed indicative pulses by an integral submultiple that is a function of a digital signal supplied from the depression sensor. A period detector is provided to measure the interval between successively generated pulses from the frequency divider. The sewing machine is driven by a motor which includes magnetically operated clutch and brake means which are respectively energized by a pulse having a duration that is a function of the measured interval. Preferably, the measured interval is represented by binary data which are applied to a digital arithmetic circuit that translates the input binary data into period data according to a predetermined transfer function describing the relationship between the measured interval and a period in which the clutch or brake means is energized. The digital pedal depression sensor includes a digital coding plate which is movable with the foot pedal with respect to a sensing device to generate position signals. Frequency division ratios are stored in a memory in the form of data words which are retrieved in response to the pedal position signals and in response to a manually operated switching device which permits selection of a desired group of frequency division data words. The retrieved data are applied to the program control inputs of the frequency divider to divide the speed related pulses.

When the frequency division ratio is changed in response to a change in pedal position to increase speed, the pulse interval measured by the period detector increases to a value which is an integral multiple of the minimum speed of the sewing machine which corresponds to the pedal position. The arithmetic circuit provides period data which increase the duty cycle of the clutch means. The sewing machine speed increases until the measured pulse interval reaches a predetermined value. When the sewing machine speed is stabilized, the pulse interval of the frequency divider is maintained constant.

BRIEF DESCRIPTION OF THE DRAWINGS

The features and advantages of the invention will become apparent from the following description when read in conjunction with the accompanying drawings, in which:

FIGS. 6 and 7 are illustrations of the relationship between foot pedal positions and sewing machine speeds which are grouped according to positions of the manual switches of FIG. 3;

DETAILED DESCRIPTION

Figure 1:
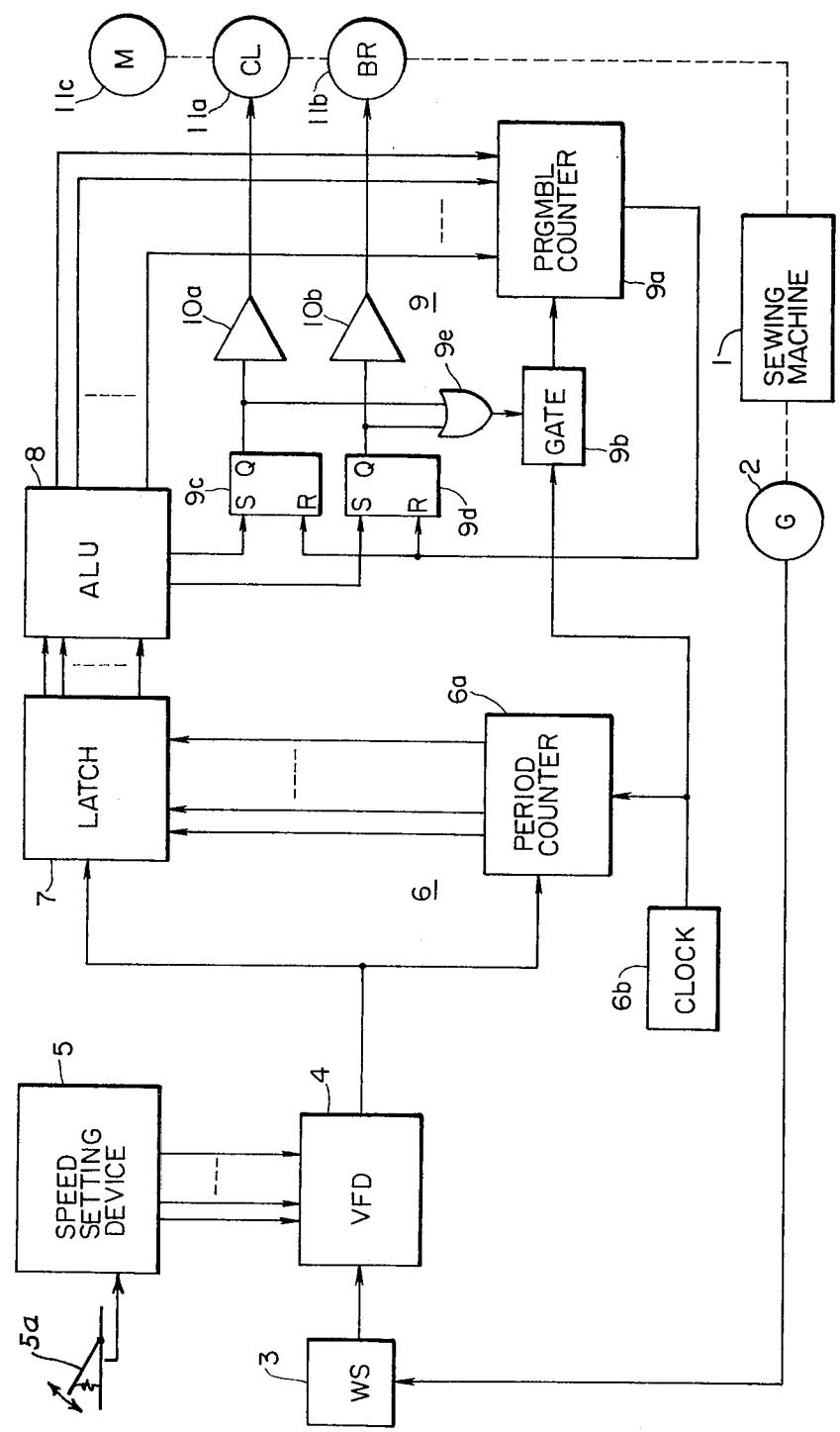
FIG. 1 is a schematic illustration of a block diagram of the digital speed control system of the invention.

Referring now to FIG. 1, a sewing machine speed control system of the invention is schematically illustrated. The system includes a sewing machine speed setting device 5 which provides a digital speed setting signal according to the amount of depression of a conventional foot pedal 5a. An impulse generator 2 of a conventional construction has its rotor operatively connected to the driven shaft of the sewing machine 1 which is driven by a motor 11c. This motor has a driving shaft which is coupled to the driven shaft of the sewing machine by a pulley-and-belt arrangement when a clutch actuating coil 11a is energized. The rotor shaft of motor M is decoupled from the sewing machine by a brake actuating coil 11b which subsequently applies a brake to the driven shaft of the sewing machine. Thus the speed of the sewing machine is controlled by varying the period of energization of coils 11a and 11b. Since the details of the motor construction are well known in the art, FIG. 1 only illustrates the associated parts in schematic form for simplicity. Impulse generator 2 generates a train of 60 equally spaced apart impulses per revolution when the rotor turns at a speed of 200 rpm. The generated impulses are shaped into rectangular pulses by a wave shaping circuit 3 and applied to a variable frequency divider 4. Frequency divider 4 has its program control inputs connected to receive digital signals from the speed setting device 5 so that its output frequency is a variable submultiple of its input frequency which is the division ratio represented by the signal from the setting device 5.

The output of frequency divider 4 is applied to a period detector 6 formed by a period counter 6a and a clock source 6b. The period counter is pulsed at each clock and reset in response to the output of frequency divider 4 to provide an output that is a binary representation of the clock count during the interval between successive pulses from variable frequency divider 4. Outputs of period counter 6a are presented to a latch 7 in response to each pulse from frequency divider 4 and thence to an arithmetic unit or function generator 8 having a predetermined transfer function describing the relationship between the interval detected by period detector 6 and a period during which each one of coils 11a and 11b is energized during an interval subsequent to the interval detected by period detector 6. As will be described in detail hereinbelow, arithmetic unit 8 provides an acceleration or deceleration signal when the detected interval is respectively greater than or less than or equal to a predetermined value and also provides an output period data to a period generator 9. Period generator 9 comprises a programmable counter 9a which receives the period data from arithmetic unit 8 to preset its full count value and is pulsed at each clock from source 6b. Further included are a gate 9b, flip-flops 9c and 9d and an OR gate 9e. Flip-flops 9c and 9d respond respectively to acceleration and deceleration signals from arithmetic unit 8 to activate coils 11a and 11b through linear amplifiers 10a and 10b. The outputs or flip-flops 9c and 9d are coupled via OR gate 9e to the control terminal of gate 9b to pass clock pulses from source 6b to programmable counter 9a. Gate 9b is thus open in response to either the acceleration and deceleration to cause programmable counter 9a to initiate counting operation. On full count, programmable counter 9a resets flip-flops 9c and 9d. Thus, flip-flops 9c and 9d each remain in a logical one state during an interval that is a function of the output period data from arithmetic unit 8, and clutch and brake coils 11a and 11b are correspondingly energized.

Figure 2:
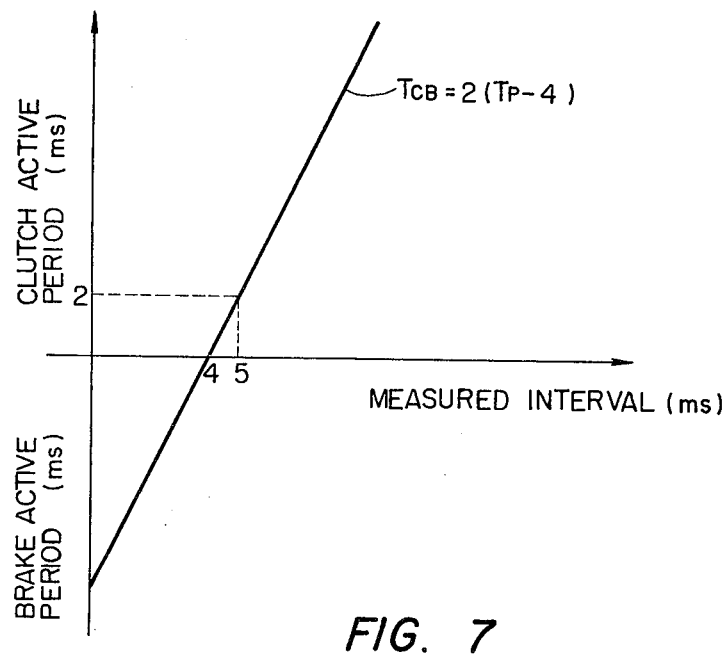
FIG. 2 is a graphic illustration of a transfer function which describes the relationship between the interval between successively generated speed pulses and energization period in which the magnetic clutch or brake is operated.

The operation of the speed control system of FIG. 1 will be better understood from the following description by reference to FIG. 2. FIG. 2 is a graphic representation of the transfer function according to which arithmetic unit 8 provides translation of input data. This transfer function is described by the following Equation:

$$T_{CB} = A(T_P - B) \quad (1)$$

where, $T_{CB}$ represents the period during which coil 11a or 11b is energized, $T_P$ represents the period detected by period detector 6, and A and B are constants. Constant A is a factor that determines the response characteristic of the speed control system, and B is appropriately determined to set the minimum speed of the sewing machine when the frequency division ratio of divider 4 is unity. Typical values of constants A and B are selected to have integers 2 and 4, respectively.

With the frequency division ratio being adjusted at a unity value by the setting device 5, impulse generator 2 generates 60 impulses per revolution for a sewing machine speed of 200 rpm. The detected interval $T_P$ by period counter 6a is 5 milliseconds as seen in FIG. 2 which corresponds to a 2-millisecond period for the $T_{CB}$ value. This means that magnetic clutch 11a is energized with a duty cycle of 40% during a subsequent interval between successive pulses from variable frequency divider 4.

If sewing machine load has increased tending to decrease speed with a resultant increase in the detected pulse interval $T_P$ by an amount determined by Equation (1), an acceleration signal is generated from arithmetic unit 8 to trigger flip-flop 9c, so that clutch coil 11a is energized with a duty cycle greater than 40%. Since sewing machine speed is proportional to an average value of clutch energization periods, an increase in duty cycle accelerates the sewing machine until it reaches 200 rpm. Conversely, a decrease in sewing machine load results in a decrease in duty cycle for clutch energization until sewing machine speed decreases to 200 rpm. If the machine speed has increased to a point above 250 rpm which corresponds to a 4-millisecond interval for $T_P$, a deceleration signal is provided by arithmetic unit 8 which triggers flip-flop 9d to energize magnetic brake 11b. As a result, the sewing machine speed rapidly decreases to 200 rpm.

If the setting device 5 is adjusted by depression of pedal 5a to vary the division ratio from unity to ½, the interval $T_P$ is doubled with a corresponding increase in clutch duty cycle. In response to this transient the sewing machine speed increases until it reaches 400 rpm at which the system is again stabilized. With the system so stabilized, the pulse interval $T_P$ and hence the duty cycle assumes the same value as when the sewing machine was run at 200 rpm, so that the $T_P$ and duty cycle values are maintained constant regardless of transient conditions once the system is stabilized to a new division ratio. The operating speed of sewing machine 1 can thus be varied at increments of an integral multiple of 200 rpm corresponding to the frequency division ratio set by device 5.

Figure 3:
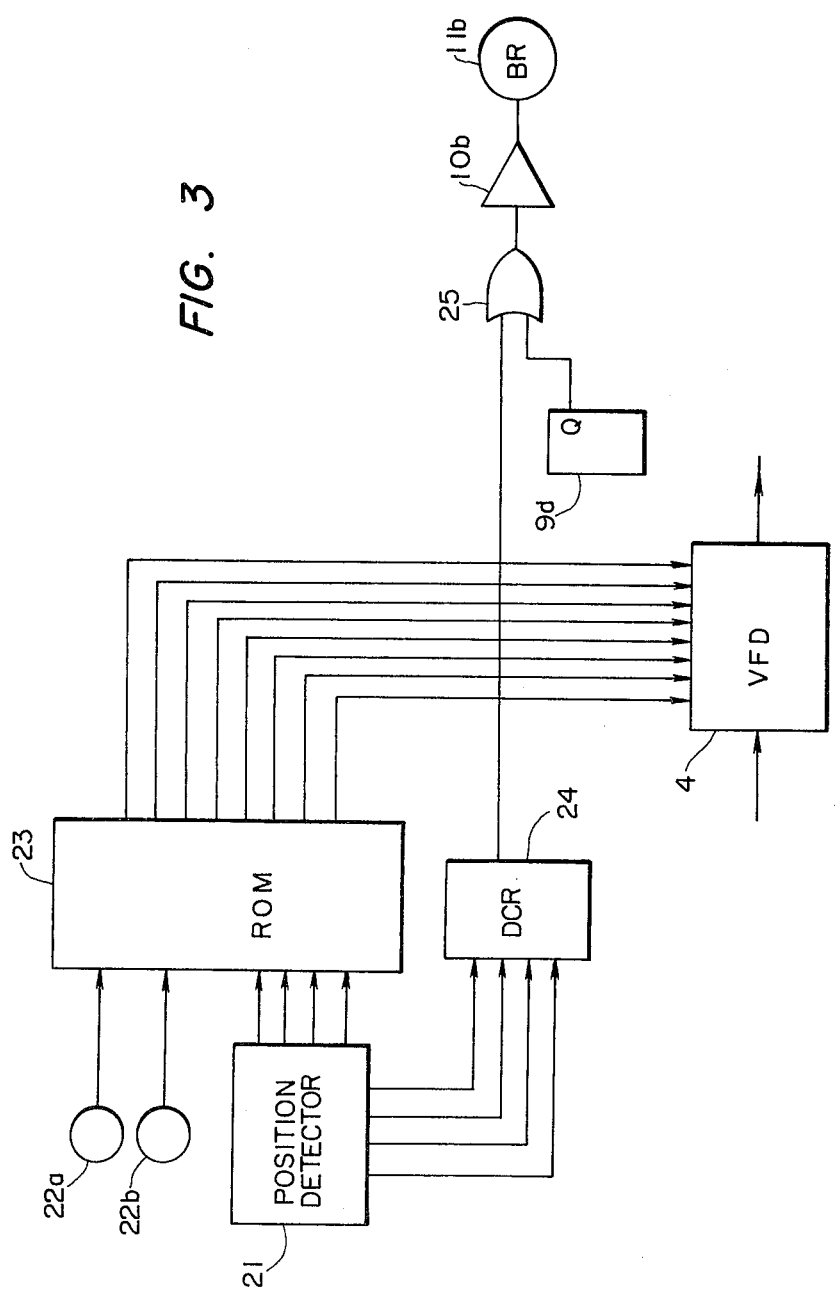
FIG. 3 is an illustration of the details of the digital speed setting device of FIG. 1.

Although the sewing machine speed can be stepwise varied from minimum to maximum values in accordance with a predetermined step function, it is desirable that the user be allowed to select a desired speed change characteristic from among a plurality of such characteristics available to meet specific sewing operations. To this end, the invention is modified as shown in FIG. 3. A pair of switches 22a and 22b is provided to generate a two-bit command signal in response to operator action. A pedal position detector 21, which will be detailed below, provides a four-bit digital position signal in accordance with the amount of depression of pedal. A read-only memory 23 is arranged to receive the digital signals from switches 22a, 22b and detector 21 to selectively retrieve an 8-bit data word from the data stored therein. The retrieved data are applied to the program inputs of variable frequency divider 4 to provide frequency division in a manner identical to that described previously.

Figure 4:
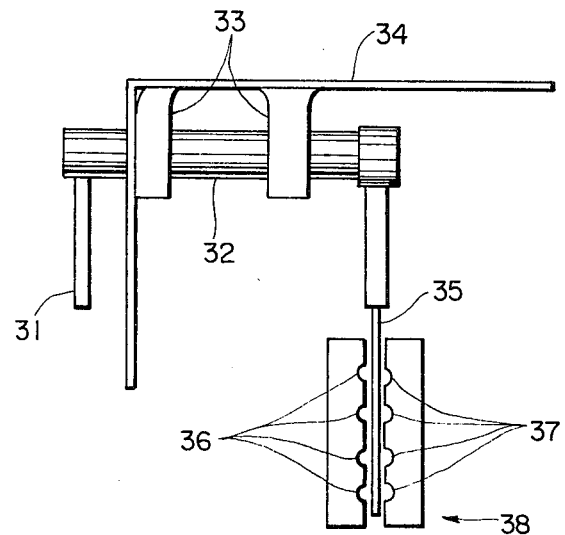
FIG. 4 is an illustration of a top plan view of an embodiment of the digital pedal position sensor of FIG. 3.
Figure 5:
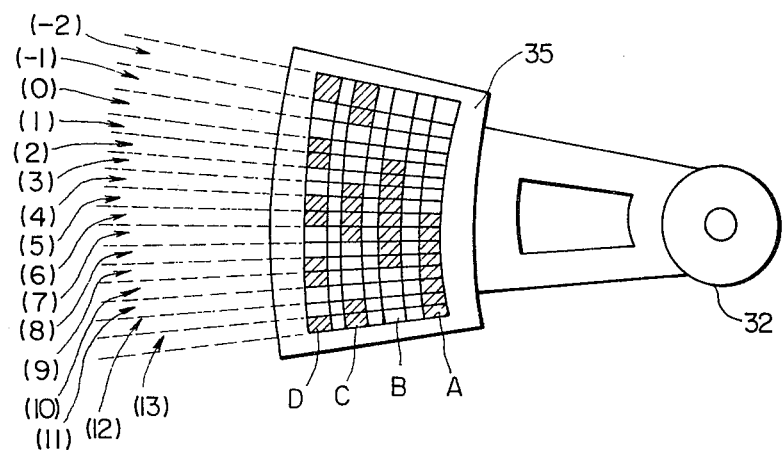
FIG. 5 is an illustration of the coding plate of the sensor of FIG. 4.

Details of pedal position detector 21 are illustrated in FIGS. 4 and 5. A lever 31 which is suitably connected to the foot pedal 5a, is fastened to an end of a shaft 32 rotatably mounted on supports 33 secured to a frame 34. A light intercepting member 35 is fitted to the opposite end of shaft 32 to swing vertically between a set of light-emitting diodes 36 and a set of corresponding light sensitive elements or photodiodes 37 which constitute an electrooptical unit 38. As clearly shown in FIG. 5, intercepting member 35 is formed with a plurality of light transmissive areas or slits which are indicated by hatched areas. Light transmissive areas are arranged in a pattern of four arcuate columns A, B, C and D and sixteen radially extending rows indicated by numbers in parentheses. Each of the photocoupler elements is positioned to correspond with a respective one of the arcuate columns to generate a four-bit digital signal. The four-bit signals that are generated in response to the intercepting member 35 being positioned in areas numbered with (1) to (13) are used to indicate the frequency division ratio. Those signals that are generated from the angular positions numbered with (−2) and (−1) are used to perform particular sewing operations. Typically, a presser bar is raised in response to the member 35 being positioned to (−1) and a thread cutter is allowed to operate when position (−2) is reached. The angular position marked (0) is a neutral position in which no light transmissive areas are present. This allows optoelectronic switch 38 to generate all "0" bits. This signal is interpreted by a decoder 24 (FIG. 3) to generate a stop signal which is applied via an OR gate 25 and amplifier 10b to brake coil 11b to stop the sewing machine.

All the binary representing areas of member 35 are arranged to form the Gray code. With the Gray code representation, there is only one bit change between adjacent angular positions. This significantly reduces the likelihood of optoelectronic switch 38 falsely discriminating between adjacent angular positions, thus eliminating false signals.

Figure 7:
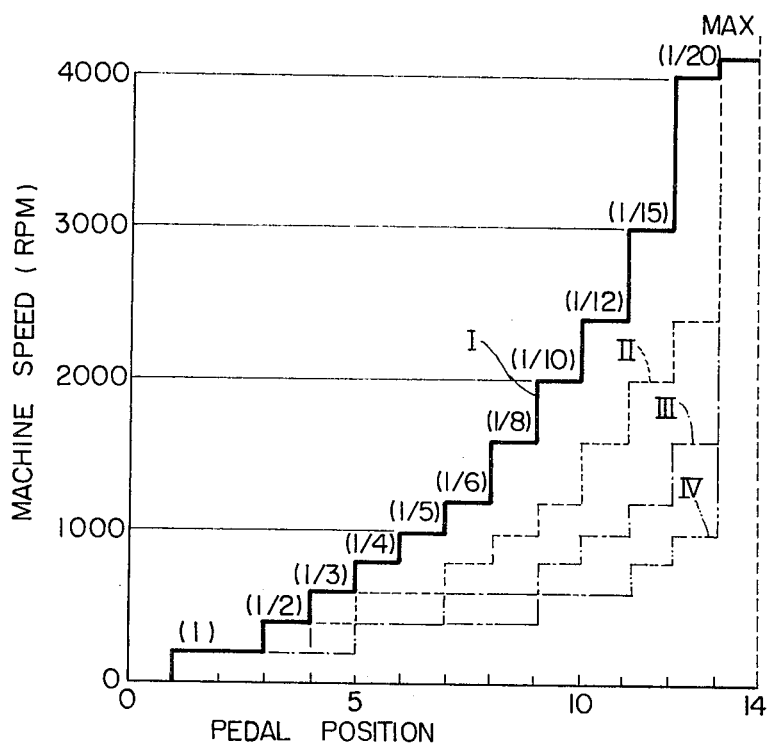

The data stored in the ROM 23 indicates frequency division ratios as described above. A typical example of division ratios is shown in FIG. 6. For each pedal position there is a set of four division ratios which can be manually selected by operating switches 22a and 22b. For example, if switches 22a and 22b are not operated representing logica zeros, a column indicated "I" is selected in which division ratios vary from "1" to "20" between pedal positions 0 and 12 and jump to "256". If switches 22a and 22b are operated so that they assume logical one and zero respectively, a column "II" is selected in which frequency division ratios vary from "1" to "12" between pedal positions ranging from 0 to 12 and jump to "256", and so forth. Although the division ratio of 256 would generate a sewing machine speed of 51,200 rpm (=200×256), this is a theoretical value which is not actually attained because of mechanical limitations. The maximum speed of the sewing machine is usually set by the driving ratio of the motor pulley to the sewing machine pulley. The frequency division ratios of FIG. 6 are plotted in FIG. 7 to present a graphic representation of the rate of stepwise variations according to different step functions indicated at I, II, III and IV.

Figure 8:
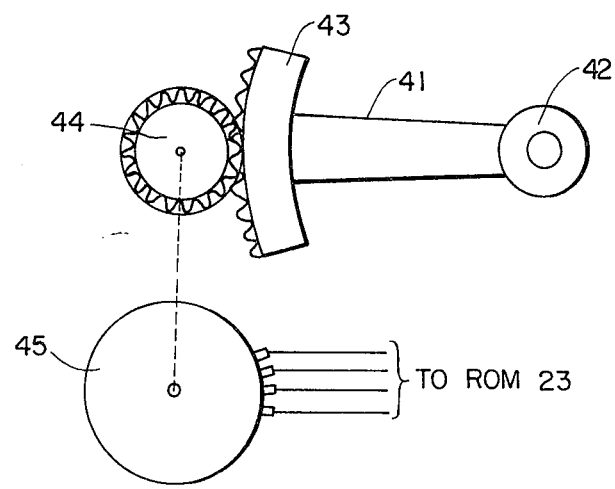
FIG. 8 is an illustration of another embodiment of the digital pedal position sensor.
Figure 9:
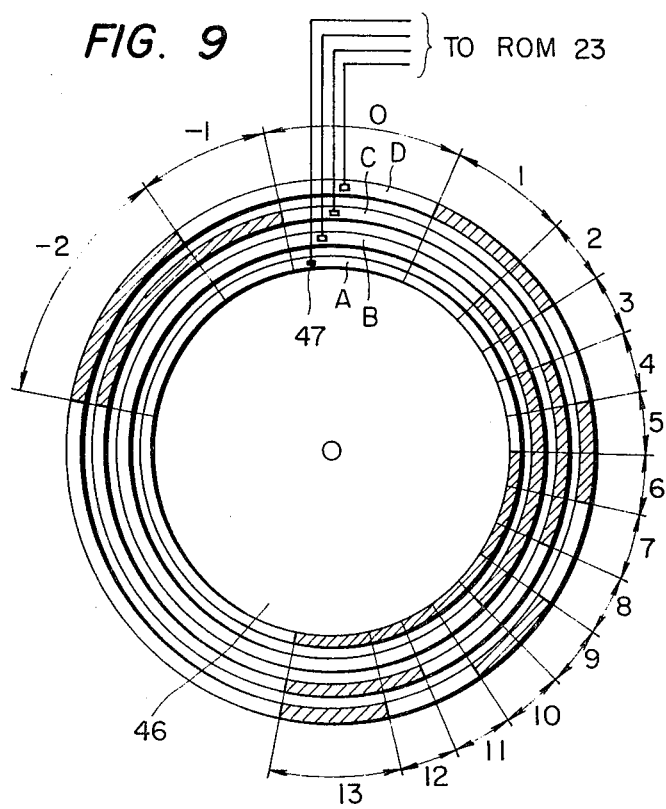
FIG. 9 is an illustration of the coding plate of the rotary encoder of FIG. 8.

FIGS. 8 and 9 are illustrations of an alternative embodiment of pedal position detector 21. An arm 41 is pivotally mounted on a shaft 42 which is rotatable with the pedal and provided with an arcuate shaped portion 43 at the free end of arm 41. A gear 44 is in mesh with the arcuate portion 43, the radius of gear 44 being smaller than the radius of the arcuate portion 43. To the rotary axis of gear 44 is secured a rotary encoder 45 for rotation therewith. Because the radius of gear 44 is smaller than the radius of sector gear 43, gear 44 rotates at a higher rate about its axis than gear 43 rotates about shaft 42, whereby the amount of pedal depression is transmitted to the rotary axis of the encoder 45 at an amplified ratio. FIG. 9 is a schematic illustration of the details of rotary encoder 45. The encoder includes an insulative member 46 on which are printed arcuate metal strips on circular bands A, B, C and D to represent a four-bit Gray code as in the previous embodiment. A set of four contacts 47 is provided to respectively make contact with a respective band. Each contact 47 has a pair of contact points which are short-circuited upon contact with the metal strip to indicate a binary state. Conductors lead from the contacts 47 respectively to ROM 23.

Since the circuit components that forms the speed control system of FIGS. 1 and 2 are digital circuits which lend themselves to adaptation to integrated-circuitry, the system can be fabricated on a single semiconductor IC chip. A significant advantage of the invention is that a microcomputer can be utilized. For example, arithmetic unit 8 can be replaced with the arithmetic unit of the microcomputer by programming it to perform Equation (1). Furthermore, variable frequency divider 4 could also be realized by a microcomputer by connecting the interrupt input terminal thereof to the output of impulse generator 2 and by programming it so that the interrupt signal is enabled for an interval depending on the speed setting signal or division signal from setting device 5. Such replacement with a microcomputer results in reduced component parts with a significant reduction in cost.

Other modifications and deviations are apparent to one ordinary skilled in the art. For example, the linear Equation (1) could be replaced with a nonlinear Equation to meet specific operating characteristics of the speed control system. If a microcomputer is employed such alteration could be easily performed by simply modifying the program.

What is claimed is:

1. A closed-loop speed control system having an accelerator and a decelerator means for controlling the speed of a moving object at a manually established setting speed corresponding to the position of a manually operated input means under varying loading conditions, comprising:

tachometer means for generating pulses at a frequency proportional to the speed of the moving object;

position detecting means for detecting the position of said manually operated means;

a memory responsive to said position detecting means for generating a digital speed control signal;

a variable frequency divider for dividing the frequency of the pulses generated by said tachometer at a variable ratio of input to output frequency in response to said speed control signal;

counter means connected for measuring the interval between successive pulses from the output of said frequency divider;

an arithmetic computing means coupled to said counter means for translating said measured interval according to a predetermined transfer function describing the relationship between said measured interval and a duration in which said moving object is to be subsequently accelerated or decelerated, and for generating a first output signal in accordance with said transfer function when said measured interval is greater than a predetermined value corresponding to said manually established setting speed and a second output signal when said measured interval is smaller than said predetermined value; and means for respectively converting said first and second output signals into first and second speed control pulses of said duration for selective application respectively to one or the other of said accelerator and decelerator means.

2. A closed-loop speed control system as claimed in claim 1, wherein said memory is provided with a plurality of sets of speed control data, each data set representing a plurality of data describing a particular relationship between the amount of manual input applied to said manually operated input means and an output signal representing said detected position, further comprising manually operated switching means for selectively addressing said data sets.

3. A closed-loop speed control system as claimed in claim 1 or 2, wherein said manually operated means comprises a pivotally movable pedal, and wherein said position detecting means comprises a set of light emitting elements and a set of light receiving elements arranged in opposed relation to the light emitting elements, and a light intercepting plate mounted for movement with said pedal through a passage between the light emitting and receiving elements and including a plurality of light transmissive areas arranged in a predetermined pattern to permit transmission of light from one or more of said light emitting elements to the corresponding light receiving elements, the outputs of said light receiving elements being coupled to said memory.

4. A closed-loop speed control system as claimed in claim 1, wherein said manually operated means comprises a pivotally movable pedal, and wherein said position detecting means comprises an insulative member mounted for movement with said pedal and a plurality of series of electrically conductive areas arranged in a predetermined pattern on said insulative member and a plurality of contacts corresponding to said series for making electrical contact with said conductive areas and coupled to said memory.

5. A closed-loop speed control system as claimed in claim 3, wherein said predetermined pattern comprises a Gray code pattern.

6. A closed-loop speed control system as claimed in claim 4, wherein said insulative member is coupled with said pedal by a gear train having a first gear movable with said pedal and a second gear mounted for movement with said insulative member in mesh with said first gear, said second gear having a smaller radius than said first gear.

7. A closed-loop speed control system as claimed in claim 1, wherein said transfer function is described by a relation $T = a(t-b)$, where, $T$ = the duration in which one of said accelerator and decelerator means is energized;
$a$ = a constant representing the loop gain of the control system;
$t$ = the measured interval; and
$b$ = a constant.

8. A closed loop speed control system for a sewing machine having a motor and a foot pedal, comprising:

tachometer means for generating pulses at a frequency proportional to the speed of the motor;

position detecting means for detecting the position of said foot pedal;

a memory responsive to said position detecting means for generating a digital speed control signal;

a variable frequency divider for dividing the frequency of the pulses generated by said tachometer at a variable ratio of input to output frequency in response to said speed control signal;

counter means connected for measuring the interval between successive pulses from the output of said frequency divider;

an arithmetic computing means coupled to said counter means for translating said measured interval according to a predetermined transfer function describing the relationship between said measured interval and a duration in which said motor is to be subsequently accelerated or decelerated, and for generating a first output signal in accordance with said transfer function when said measured interval is greater than a predetermined value corresponding to said manually established setting speed and a second output signal when said measured interval is smaller than said predetermined value;

means for respectively converting said first and second output signals into first and second speed control pulses of said duration, respectively;

solenoid clutch means responsive to said first speed control pulse for transmitting the motive power of said motor to the sewing machine; and solenoid brake means responsive to said second control pulse for applying braking to said motor.

9. A sewing machine as claimed in claim 8, wherein said memory is provided with a plurality of sets of speed control data, each data set representing a plurality of data describing a particular relationship between the amount of angular displacement of said foot pedal from a reference position and an output signal representing said detected position, further comprising manually operated switching means for selectively addressing said data sets.

10. A sewing machine as claimed in claim 8 or 9, wherein said position detecting means comprises a set of light emitting elements and a set of light receiving elements arranged in opposed relation to the light emitting elements, and a light intercepting plate mounted for movement with said foot pedal through a passage between the light emitting and receiving elements and including a plurality of light transmissive areas arranged in a predetermined pattern to permit transmission of light from one or more of said light emitting elements to the corresponding light receiving elements, the outputs of said light receiving elements being coupled to said memory.

11. A sewing machine as claimed in claim 8, wherein said position detecting means comprises an insulative member mounted for movement with said foot pedal and a plurality of series of electrically conductive areas arranged in a predetermined pattern on said insulative member and a plurality of contacts corresponding to said series for making electrical contact with said conductive areas and coupled to said memory.

12. A sewing machine as claimed in claim 10, wherein said predetermined pattern comprises a Gray code pattern.

13. A sewing machine as claimed in claim 11, wherein said insulative member is coupled with said pedal by a gear train having a first gear movable with said pedal and a second gear mounted for movement with said insulative member in mesh with said first gear, said second gear having a smaller radius than said first gear.

14. A sewing machine as claimed in claim 8, wherein said transfer function is described by a relation $T=a(t-b)$, where, $T=$ the duration in which one of said solenoid clutch means and said solenoid brake means is energized;

$a=$ a constant representing the gain of the closed loop;
$t=$ the measured interval; and
$b=$ a constant.

15. A method of controlling the speed of a moving object under varying loading conditions, comprising the steps of:

generating pulses at a frequency proportional to the speed of the moving object;

manually positioning a speed setting means;

detecting the position of the speed setting means to obtain a speed setting;

generating a stored digital speed control signal in accordance with the position detected during said position detecting step;

dividing the frequency of the pulses at a variable ratio as a function of the digital speed control signal generated during said digital speed control signal generating step;

measuring the interval between successive pulses generated during said variable frequency dividing step;

translating the measured interval according to a predetermined transfer function describing the relationship between the measured interval and a duration in which the moving object is to be subsequently accelerated or decelerated, and generating a first output signal in accordance with said transfer function when the measured interval is greater than a predetermined value corresponding to the speed setting and a second output signal when the measured interval is smaller than the predetermined value of the speed setting; and converting the first and second output signals into first and second speed control pulses of said duration; and applying selectively said converted first and second pulses to a means for respectively accelerating and decelerating said moving object.

16. A speed control method of claim 15, wherein said moving object is a sewing machine element, said speed setting step includes manually controlling the position of a foot pedal of the sewing machine and the first and second output signals generated during said converting step are applied to control solenoid clutch means for controlling the motive power of said motor to said sewing machine.

* * * * *